US009177274B2

(12) United States Patent
Kramer

(10) Patent No.: US 9,177,274 B2
(45) Date of Patent: Nov. 3, 2015

(54) QUEUE WITH SEGMENTS FOR TASK MANAGEMENT

(75) Inventor: Mykel John Kramer, Colorado Springs, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 281 days.

(21) Appl. No.: 13/590,323

(22) Filed: Aug. 21, 2012

(65) Prior Publication Data

US 2014/0059557 A1 Feb. 27, 2014

(51) Int. Cl.
*G06F 9/46* (2006.01)
*G06Q 10/06* (2012.01)
*G06F 9/48* (2006.01)
*G06F 9/50* (2006.01)

(52) U.S. Cl.
CPC .............. *G06Q 10/06* (2013.01); *G06F 9/4881* (2013.01); *G06F 9/5011* (2013.01)

(58) Field of Classification Search
CPC ........ G06F 9/488; G06F 9/4881; G06F 50/11
USPC .................. 718/101, 102, 103, 104
See application file for complete search history.

(56) References Cited

U.S. PATENT DOCUMENTS

| 6,272,606 | B1* | 8/2001 | Dorricott et al. ............... 711/158 |
| 7,843,816 | B1 | 11/2010 | Zhang et al. | |
| 8,094,804 | B2 | 1/2012 | Flockhart et al. | |
| 2009/0327216 | A1 | 12/2009 | Brown et al. | |
| 2011/0078696 | A1* | 3/2011 | Blackburn et al. ............ 718/104 |
| 2012/0044806 | A1 | 2/2012 | Park et al. | |

OTHER PUBLICATIONS

S. Moeller, et al."Routing Without Routes: the Backpressure Collection Protcol" Copyright //ceng.usc.edu/~bkrishna/research/papers/RoutingWithoutRoutes_IPSN10.pdf > 2010.
Bacigalupo, D. A. et al. "Managing Dynamic Enterprise and Urgent Workloads on Clous Using Layered Queuing and Historical Performanc Models", Jan. 17, 2011, 30 pgs.
Your Maintenance Backlog is a Queue of Work Orders. You Can Manage Maintenance Backlogs More Effectively by Applying Queuing Theory, retreived from the web Aug. 20, 2012, 5 pgs.

* cited by examiner

*Primary Examiner* — Camquy Truong
(74) *Attorney, Agent, or Firm* — Hewlett-Packard Patent Department

(57) ABSTRACT

A method that includes configuring a queue into a plurality of segments, wherein each segment is associated with a depth factor which defines number of entries of task elements capable of being added in each segment, and wherein each segment is associated with a requirement factor; generating a plurality of task elements, each task element having an importance factor; and if a value of an importance factor of a task element is at least equal to a value of a requirement factor of a segment with an available entry to add the task element, then adding the task element in the entry of the segment.

20 Claims, 14 Drawing Sheets

QUEUE WITH SEGMENTS FOR TASK MANAGEMENT

BACKGROUND

A queue is a data structure or abstract data type with entries which can be used to hold a plurality of data objects in a particular order. A system can perform operations on the queue such as adding data objects to the end position of the queue and removing data objects from the beginning position of the queue.

BRIEF DESCRIPTION OF THE DRAWINGS

Certain examples are described in the following detailed description and in reference to the drawings, in which.

DETAILED DESCRIPTION OF SPECIFIC EXAMPLES

Figure 1:
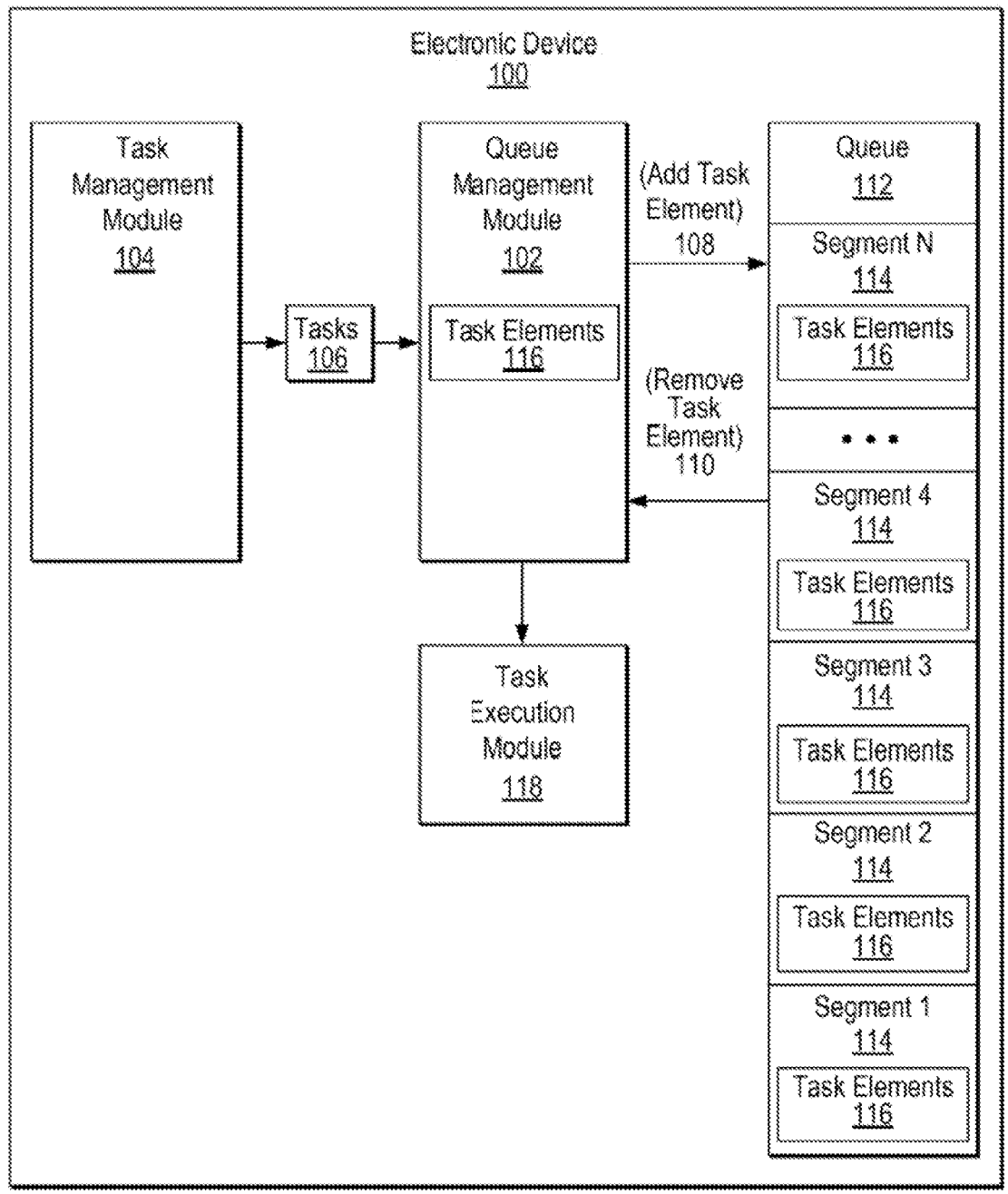
FIG. 1 is an example block diagram of an electronic device with a queue with segments for task management.

As explained above, a queue is a data structure or abstract data type with entries which can be used to hold a plurality of data objects in a particular order. A system can perform operations on the queue such as adding data objects to the end position of the queue and removing data objects from the beginning position of the queue.

In one example of the techniques of the present application, an electronic device can employ a queue to help process data that includes tasks that can represent work or functions to be performed for proper operation of the electronic device. The electronic device can perform operations on the queue such as adding or storing tasks to the end position of the queue and removing or retrieving tasks from the beginning position of the queue. In addition, the tasks can be associated with an importance factor or priority level to indicate the importance of one task relative to other tasks. A queue can be used to track outstanding tasks having different importance factors. Some of the tasks that are to be executed by the electronic device can provide relatively high value or are of a high priority to the device, whereas other tasks may provide relatively little value or little benefit to the device.

It may be important to manage tasks to help assure that the tasks with the highest importance or highest priority value can be performed or executed before lower value tasks are performed. It may also be important that such tasks be executed in a timely manner otherwise they may not provide the expected benefit to the system.

In one example, the techniques of the present application may provide a queue configured to hold outstanding tasks representing work to be executed for proper operation of the electronic device. The requirement for tasks to be added on entries of the queue is a basic condition which indicates that work needs to be performed as requested by the electronic device. Some tasks may be more important, or of higher value, than other tasks. The techniques of the present application include a method to monitor for a backlog condition in a queue such. In addition, such techniques can determine the importance of tasks which may need to be added or placed on the queue based on the current environment or situation of the work to be done by the electronic device. In one example, the queue can be managed in a manner where the most important tasks are executed first, until all is completed. The process can manage the queue such that the next level of important tasks can be executed until either, more work or tasks are received for processing, or entries for adding tasks on the queue are available.

In one example, the present application provides techniques that include a queue management method that includes configuring a queue into logical segments with each segment have a depth or number of entries to support or old task elements. Task elements can be configured as data structures representing tasks or work to be performed for proper operation of an electronic device. For example, to illustrate, the queue can be configured to have four logical segments. Initially, when the queue has no elements or a depth of zero, any task element that is received that satisfies a minimum requirement factor of the segment can be placed on an entry of the segment of the queue. Once X task element entries have been added to the queue, the requirement to be added to the queue increases by a particular factor. Once the number of task elements on the queue reach a depth of 2x, the requirement to be added to the queue increases by 2x the requirement factor. If the queue can process the tasks and keep up with all the tasks, then there is little concern with a backlog condition, and queue management may not be necessary. On the other hand, in a case where the queue cannot keep up with task elements, then the queue may experience a backlog or backup condition up to a certain point, based on the highest value task element. If there are task elements that can satisfy a 3x requirement, then the queue may operate with 4 segments and only accept task elements that can satisfy the 3x requirement. When all the tasks are executed, the queue may no longer be able to accept or add tasks to the fourth segment, and therefore may only be able to process the tasks that satisfy the 2x requirement. This process can continue until the queue catches up, or the depth of the queue increase again because work satisfying a higher requirement is requested.

In one example, the techniques of the present application can provide an electronic device that includes a queue that can be configured to have a queue data structure to support a plurality of entries to store task elements. The electronic device can include a queue management module which can configure the queue into a plurality of segments. Each segment can be associated with a depth factor which defines number of entries of task elements capable of being added in each segment. Each segment is associated with a requirement factor which can represent a minimum value that an importance factor of a task element is to have to be added in the segment. The queue management module can generate a plurality of task elements. Each task element has an importance factor which represents an importance of the task associated with the task element relative to other tasks. If a value of an importance factor of a task element is at least equal to a value of a requirement factor of a segment with an available entry to add the task element, then the task element is added to the entry of the segment. The electronic device can include a task execution module to initiate tasks associated with the task elements from the queue. The task elements can be based on tasks which are generated by a task management module based on work requested to be performed by the electronic device.

The techniques of the present application may exhibit advantages. For example, the queue management techniques can adapt based on the importance or priority levels of the tasks that are being requested to be performed. The queue of the present application can be configured to perform effectively as a priority queue. However, the queue of the present application may reduce the need to perform any sorting, which may reduce the amount of processor resources such as number of processor cycles necessary for execution. This may also have an advantage because the techniques can throttle or adjust the maximum amount of workload of tasks. At some point in the process, the requirement necessary for a task to be placed on the queue may become so large, that it may not be possible for the task element to satisfy the requirement and the task may not be added to the queue.

Furthermore, the queue management techniques of the present application may provide the ability to adjust the size of the queue so that such a limit may correspond to a queue that can be emptied quickly, which may increase the quality of service of a particular application. Once a task element is added to an entry of the queue, the task element may be associated with a maximum amount of time which indicates the amount of time before being removed from the queue for execution by the electronic device. In this manner, a task associated with a task element may be assigned a period of time to be completed or executed so as to still provide useful results for the electronic device. If there is are no high value or priority task elements to be executed, the processor resources, such as processor cycles, may be spent on lower value task elements, which may be desirable since the task elements may still provide a useful benefit for the electronic device. In this manner, the queue management techniques can adjust to its current environment. This may reduce the occurrence of being too liberal or loose with requirements when important tasks need to be performed, or too strict or conservative with the requirements when there is not a sufficient amount of tasks to be performed.

Furthermore, the queue management techniques can configure segments of a queue and depth of the queue which can also help guide resource allocation. For example, this may occur if there are multiple tasks or work threads that may be removing tasks or work off the queue and executing the requests associated with the tasks. An increased queue depth may suggest that more tasks or worker threads be used because tasks or work may be more important and therefore justify using the extra processor resources such as processor cycles. On the other hand, if the number of task elements on the queue, that is queue depth, resides in just the first segment, then a lower threshold of tasks or work may be allowed to be executed because the tasks or work may not be of a sufficient high value.

FIG. 1 is an example block diagram of an electronic device with a queue with segments for task management. The electronic device 100 includes a queue management module 102, a task management module 104, a queue 112 and a task execution module 118.

The queue 112 can be configured as a queue data structure with a plurality of segments 114. The segments 114 can be configured as logical segments or partitions and each segment can include a plurality of entries to support storage or addition and subsequent retrieval or removal of task elements 118, in one example, queue 112 is shown as having Segment 1 through Segment N but the queue can be configured to have any number of segments as required by a particular application of electronic device 100. The number of segments can be predefined or determined in a static manner or determined in a dynamic manner based on a particular application such as workload profile of electronic device 100.

The queue management module 102 can include functionality to manage queue 112. For example, queue management module 102 can configure or partition the queue into a plurality of segments 114. The queue management module 102 can configure segments 114 to have a size which can be associated with a depth factor defined by a number of entries of task elements capable of being stored or added to the segments. The queue management module 102 can assign to segments 114 a requirement factor. In one example, the requirement factor can represent or define a minimum value that an importance factor of a task element is to have to be stored or added in particular segments 114 of queue 112. In one example, the requirement factor of a segment may be assigned a value of 50 and the importance factor of the task element may be assigned a value of 75. In this case, the value 75 is greater than 50 and the task element may be added to the segment of the queue.

The queue management module 102 can generate a plurality of task elements 116. The task elements 116 can be assigned an importance factor. In one example, an importance factor can represent an importance or priority of the task associated with the task element relative to other tasks. The importance factors and requirement factors can be can be predefined or determined in a static manner or determined in a dynamic manner based on a particular application such as workload profile of electronic device 108.

The queue management module 102 can process task elements 116 to determine whether the task elements are to be stored or added on particular segments of queue 112. For example, queue management module 102 can compare a value of an importance factor of a task element to a value of a requirement factor of a segment with an available entry to determine whether to store the task element to an entry of segment of the queue. If queue management module 102 determines that value of an importance factor of a task element is at least equal to a value of a requirement factor of a segment with an available entry to store the task element, then the queue management module proceeds to add the task element in the entry of the segment, as shown by arrow 108. On the other hand, if queue management module 102 determines that a value of an importance factor of a task element is not at least equal to a value of a requirement factor of a segment, then the queue management module does not add the task element in an entry of the segment.

The queue management module 102 includes a task handler function to periodically remove or retrieve task elements 116 from queue 112, as shown by arrow 110, and forward the task elements to task execution module 118. The task handler function can be configured to perform this function in a periodic manner with a time period which can be based on factors such as workload profile or pattern of an application of electronic device 100. The task execution module 118 can be configured to initiate tasks associated with task elements 116 from queue 112.

The task management module 104 can be configured to process tasks required to be performed by electronic device. In one example, task elements 116 can be based on tasks which are generated by task management module 104 based on work requested to be performed by electronic device 100. For example, a task element 116 can represent a task or work associated with movement of data requested to be performed by electronic device.

The electronic device 100 can be any computing device capable of, processing data. The components of electronic device 100, including queue management module 102, task management module 104, queue 112, task execution module 118, can be implemented in hardware, software or a combination thereof. The techniques of the present application implemented on electronic device 100 can be implemented on, for example, a server, personal computer, notebook or any other computing device having a processor for executing instructions on a memory storage device. The electronic device 100 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure and the like.

In a simple hardware configuration electronic device 100 can include a processor system having one or more processing units such as processors and memory. The processing units may include two or more processing cores on a chip or two or more processor chips. In some examples, the electronic device can also have one or more additional processing or specialized processors (not shown), such as a graphics processor for general-purpose computing on graphics processor units, to perform processing functions offloaded from the processor. The memory may be arranged in a hierarchy and may include one or more levels of cache. Depending on the configuration and type of electronic device, memory may be volatile such as random access memory (RAM), non-volatile such as read only memory (ROM), flash memory, etc., or some combination of the two.

The electronic device 100 may also include additional storage. Examples of storage include disk drives, optical drives, solid-state drives, and the like. Additionally, the electronic device 100 device can be configured to accept memory cards, optical discs, and the like as storage. The memory can include volatile and nonvolatile, removable and non-removable media implemented in any suitable method or technology for storage of information such as computer readable instructions, data structures, program modules or other data. Computer storage media includes RAM, ROM, EEPROM, flash memory or other memory technology, optical storage such as CD-ROM and digital versatile discs (DVD), magnetic storage devices such as magnetic tapes and magnetic disks, solid-state drives, flash storage devices such as universal serial bus (USB) flash drive and flash memory cards, or any other storage medium that can be used to store the desired information and that can be accessed by electronic device 100. Any such computer storage media may be part of computing device 100.

The electronic device 100 can include input/output mechanisms to allow the electronic device to communicate external to the electronic device. The electronic device 100 can include one or more input/output connections, such as USB connections, display ports, proprietary connections, and others to connect with various devices to provide inputs and outputs to the electronic device.

For example, device 100 can include an output mechanism to provide information or data external to the electronic device and can include a graphical display device, an audio device, speakers, printer, a combination thereof or any other suitable output mechanism. In one example, an output mechanism can be used to allow a user to view information related to the operation of the device including performance of the queue.

In another example, electronic device 100 can include an input mechanism to allow the device to receive information or data external to the device and can include a keyboard, a touch input device, a pointing device such as a track pad and mouse, stylus, voice input device, a combination thereof or any other suitable input mechanism. In one example, an input mechanism can be used to allow a user to provide information to configure the operation of the device including importance factors, requirement factors and the like.

In another example, electronic device 100 can include a communication mechanism to allow the electronic device to communicate over communication connections, such as Ethernet, with other electronic devices and the like. In one example, electronic device 100 can include one or more communication connections at allow the electronic device to communicate with other electronic devices. Example communication connections can include an Ethernet interface, a wireless interface, a bus interface, a storage area network interface, a proprietary interface and the like. The communication connections can be used to couple electronic device to a computer network, which can be classified according to a wide variety of characteristics such as topology, connection method, and scale. A computer network can include a collection of computing devices and possibly other devices interconnected by communications channels that facilitate communications and allows sharing of resources and information among the interconnected devices. Examples of computer networks include a local area network, a wide area network, the Internet, or other network.

In one example, electronic device 100 can be configured as a storage area network (SAN) system. The SAN system can include a network that can provide access to block level data storage. A SAN system can be configured with storage devices, such as disk arrays, tape libraries accessible to servers so that the devices appear like locally attached devices to the system. In another example, electronic device 180 can be configured as a storage network attached storage (NAS) device. The NAS system can provide file level computer data storage and can connect to a computer network providing data access to different group of clients. The NAS system can operate as a file server and can be implemented using hardware, software, or configuration of those elements. The NAS system can include a network of appliances which can contain one or more hard drives which can be configured as logical, redundant storage containers or RAID arrays. In one example, the queue management techniques of the present application can be used to manage and perform tasks related to movement of data between storage devices or tiers of storage devices. In another example, the techniques can be employed to implement tasks for performing automated tiered storage technology which can include automated movement of data across different tiers (types) of storage devices and media. The tasks can include automatic movement of data to different types of disk according to performance and capacity requirements.

Figure 2:
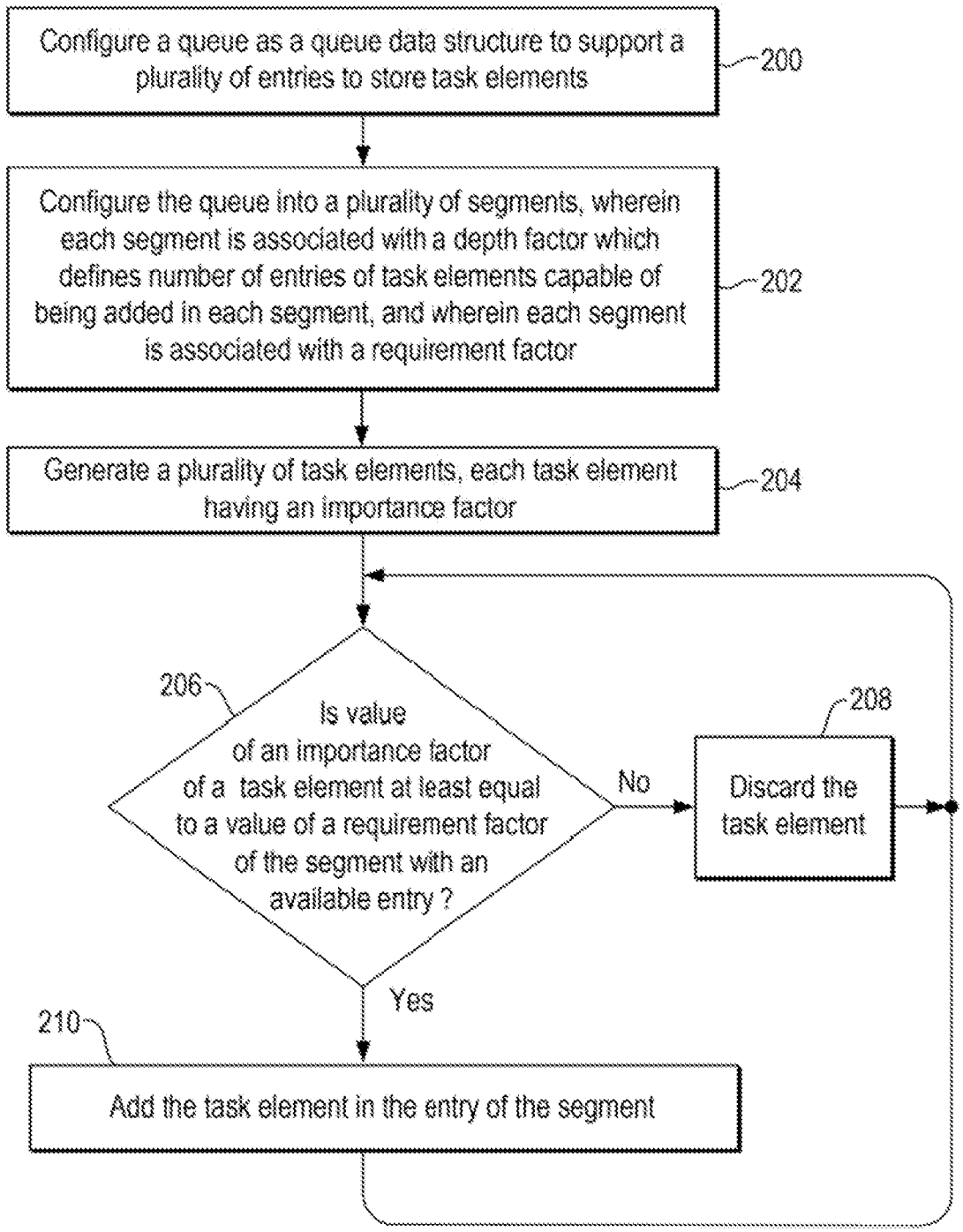
FIG. 2 is an example process flow diagram of a method of managing a queue with segments for task management.

FIG. 2 is an example process flow diagram of a method of managing a queue with segments for task management.

At block 200, electronic device 100 can configure a queue as a queue data structure to support a plurality of entries to add task elements. In one example, to illustrate, with reference to FIG. 3A, it can be assumed that queue management module 102 can configure queue 300 as a data structure to support a plurality of entries to add task elements.

At block 202, electronic device 100 configures queue 300 into a plurality of segments. The segments can be associated with depth factors which may define a number of entries of task elements capable being added in each segment. In addition each segment can be associated with a requirement factor. In one example, to illustrate, with reference to FIG. 3A, it can be assumed that queue management module 102 configures or partitions queue 300 into five logical segments comprising Segment 1 through Segment 5. The Segment 1 is configured to have a depth or size of two entries to support storage of two task elements whereas Segment 2 through Segment 5 each are configured to have a depth or size of one entry to allow each segment to support storage of one task element. It should be understood that the configuration of queue 300 is for illustrative purposes and that the techniques of the present application can be employed with other queue configurations. For example, queue management module 102 can configure queue 300 to have a different number of segments and configure each segment to have the same depth size, different depth sizes or combination thereof.

Further, to illustrate, the requirement factors of the segments can be configured in an escalating or increasing equal incremental linear fashion. For example, Segment 1 is configured to have a requirement factor value of 25, Segment 2 is configured to have a requirement factor value of 50, Segment 3 is configured to have a requirement factor value of 75, Segment 4 is configured to have a requirement factor value of 100, and Segment 5 is configured to have a requirement factor value of 125. It should be understood that the configuration of the values of the requirement factors in a linear fashion is for illustrative purposes and that the techniques of the present application can be employed with other requirement factor configurations. For example, queue management module 102 can configure the requirement factors to have non-linear values or other configurations. In this example, it is further assumed that the values of the importance factors of task elements are configured to be in a range of 0-100. In this example, this means that it is possible for the task elements to be added to in an entry in Segment 1 through Segment 4, but it is not possible for the task elements to be added to an entry in Segment 5. It should be understood that the configuration of the values of the importance factors of the task elements is for illustrative purposes and that the techniques of the present application can be employed with other requirement factor configurations.

At block 204, electronic device 100 generates a plurality of task elements, each task element having an importance factor. To illustrate, in one example, with reference to FIG. 3B, it can be assumed that queue 300 is initially empty and that no task elements have been added to the entries of Segment 1 through Segment 5. In one step of the process of the present application, queue management module 102 receives a first task from task management module 104 and responds by generating a new task element 302 with an importance factor value of 75. The queue management module 102 proceeds to process new task element 302 as described next in block 206 below.

At block 206, electronic device 100 compares a value of an importance factor of a task element to determine whether it is at least equal to a value of a requirement factor of the segment with an available entry. For example, continuing with the above example, with reference FIG. 3B, queue management module 102 determines that queue 300 has an empty entry in Segment 1 and that the requirement factor of Segment 1 has a value of 25. In this case, queue management module 102 determines that the importance factor value of 75 of task element 302 is equal to or greater than the value of 25 of requirement factor of Segment 1, and then processing proceeds to block 210 where the queue management module adds task element 302 to the first entry of Segment 1. On the other hand, if queue management module 102 determines that the value of an importance factor of a task element was not equal to or greater than the value of a requirement factor of the segment with an available entry, then the queue management module discards or ignores the task element, that is, it does not add the task element to an entry of queue as described below in block 208.

At block 208, electronic device 100 discards the task element. In one example, if queue management module 102 determines that the value of an importance factor of a task element was not equal to or greater than the value of a requirement factor of the segment with an available entry, then the queue management module discards or ignores, that is, it does not add task element to an entry of queue 300. Once this function is performed, processing proceeds back to block 206 where queue management module 102 continues to process task elements.

At block 210, electronic device adds the task element in the entry of the segment. In the example above, queue management module 102 adds task element 302 to the first entry of Segment 1. Once queue management module 102 stores task element 302 in the first entry of Segment 1, processing proceeds back to block 206 where the queue management module continues to process task elements.

Although not shown in the process of FIG. 2, queue management module 102 includes a task handler function which periodically removes task elements from segments of the queue. The queue management module 102 then forwards the task element to task execution module 118 for execution for proper operation of electronic device 100.

FIGS. 3A-3K are example diagrams showing operation of a queue 300 with segments for task management. In one example, the process of managing or operating queue 300 includes performing a series of operations for managing the queue as illustrated in the sequence illustrated in FIG. 3A through FIG. 3K and as described in detail below. It should be understood that this sequence of operations is for illustrative purposes and that a different sequence of operations can be employed by the techniques of the present application.

Figure 3A:
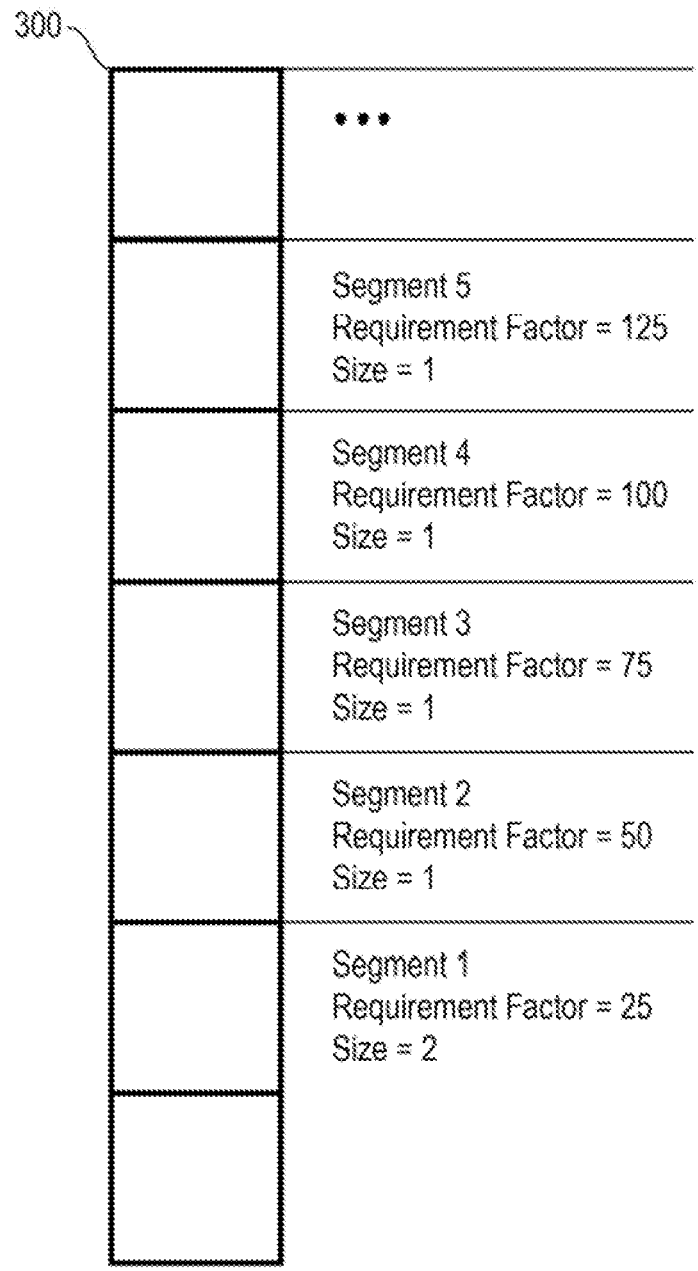
FIGS. 3A-3K are example diagrams showing operation of a queue with segments for task management.

FIG. 3A shows initialization of queue 300 with segments for task management. In one example, to illustrate, it is assumed that queue management module 102 configures or partitions queue 300 into five logical segments comprising Segment 1 through Segment 5. The Segment 1 is configured to have a depth or size of two entries to support storage of two task elements whereas Segment 2 through Segment 5 each are configured to have a depth or size of one entry to allow each segment to support storage of one task element. It should be understood that the configuration of queue 300 is for illustrative purposes and that the techniques of the present application can be employed with other queue configurations. For example, queue management module 102 can configure queue 300 to have a different number of segments and configure each segment to have the same depth size, different depth sizes or combination thereof than the queue 300 illustrated in FIG. 3A.

Further, to illustrate, the requirement factors of the segments are configured in an escalating or increasing equal incremental value linear fashion. For example, Segment 1 is configured to have a requirement factor value of 25, Segment 2 is configured to have a requirement factor value of 50, Segment 3 is configured to have a requirement factor value of 75, Segment 4 is configured to have a requirement factor value of 100, and Segment 5 is configured to have a requirement factor value of 125. It should be understood that the configuration of the values of the requirement factors in a linear fashion is for illustrative purposes and that the techniques of the present application can be employed with other requirement factor configurations. For example, queue management module 102 can configure the requirement factors to have non-linear values or other configurations.

In this example, it is further assumed that the values of the importance factors of task elements are configured to be in a range of 0-100. In this example, this means that it is possible for the task elements to be added to an entry in Segment 1 through Segment 4, but it is not possible for the task elements to be added to an entry in Segment 5. In other words, a task element could not have a value of importance factor equal to or greater than the value of requirement factor of Segment 5 which is 125. It should be understood that the configuration of the values of the importance factors of the task elements is for illustrative purposes and that the techniques of the present application can be employed with other importance factor configurations. Further, to illustrate, the queue has not been configured to have an explicit overall maximum length or size, but rather the queue has been configured to have a theoretical maximum that will be reached once the required value is not possible to satisfy, in addition, the example below describes a process of handling a particular sequence or order of task elements, however it should be understood that it is for illustrative purposes and the technique of the present application can employ a process with a different sequence, number and other characteristics of task elements.

Figure 3B:
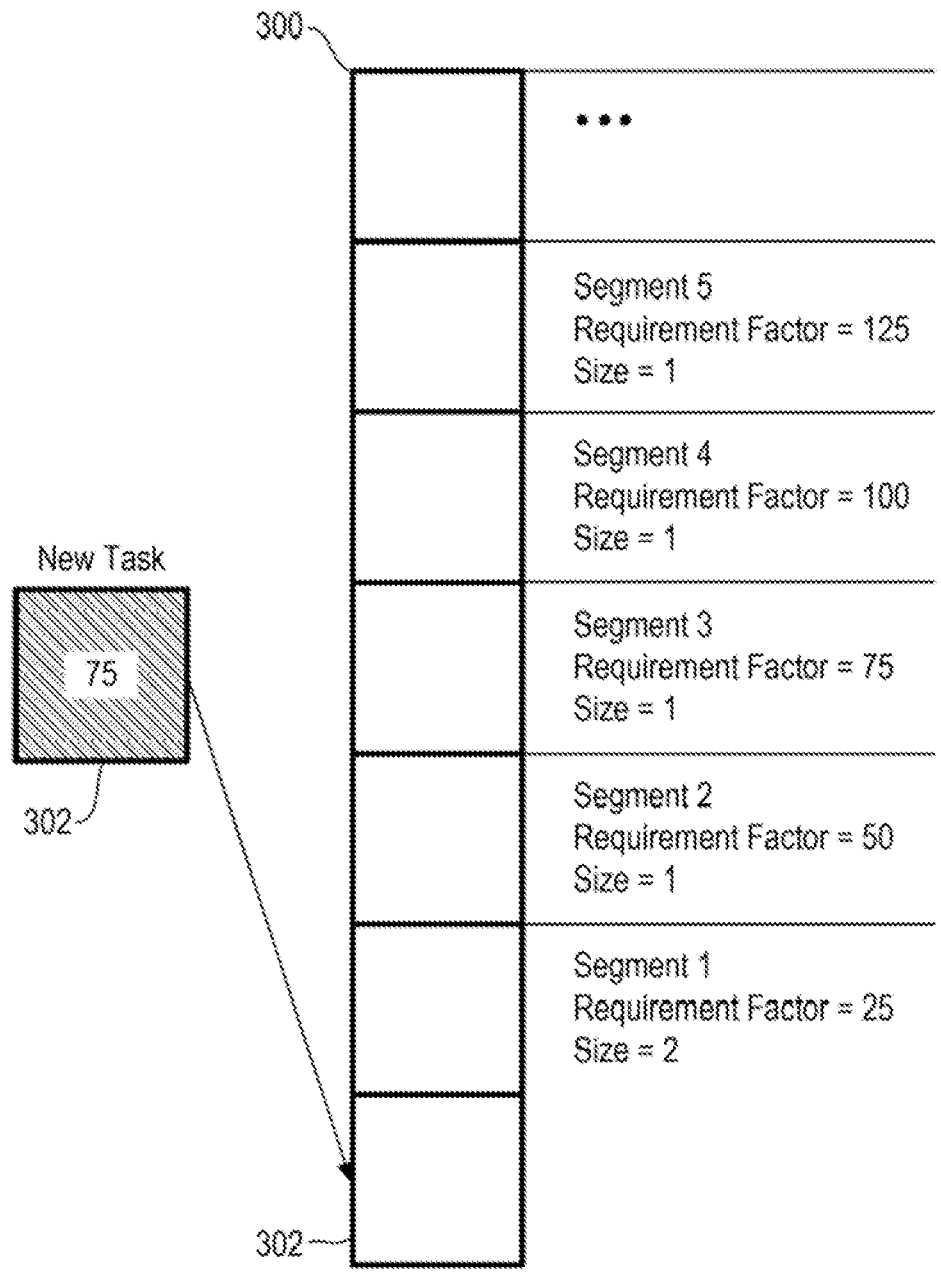

FIG. 3B shows a further step in the operation of queue 300 with segments for task management. To illustrate, in one example, it is assumed that queue 300 is initially empty and that no task elements have been added or stored in the entries of Segment 1 through Segment 5. In an initial step of the process of the present application, queue management module 102 receives a first task from task management module 104 and responds by generating a new task element 302 with an importance factor value of 75. The queue management module 10 determines that queue 300 has an empty entry in Segment 1 and that the requirement factor of Segment 1 has a value of 25. In this case, queue management module 102 determines that the importance factor value of 75 of task element 302 is equal to or greater than the value of 25 of requirement factor of Segment 1. In this case, queue management module 102 adds task element 302 to the first entry of Segment 1. Although the importance factor value of 75 of task element 302 is of a value high enough to satisfy the requirement to be stored in Segment 3, queue management module 102 adds this new task element to the bottom of queue 300, as this would operate as a standard queue.

Figure 3C:
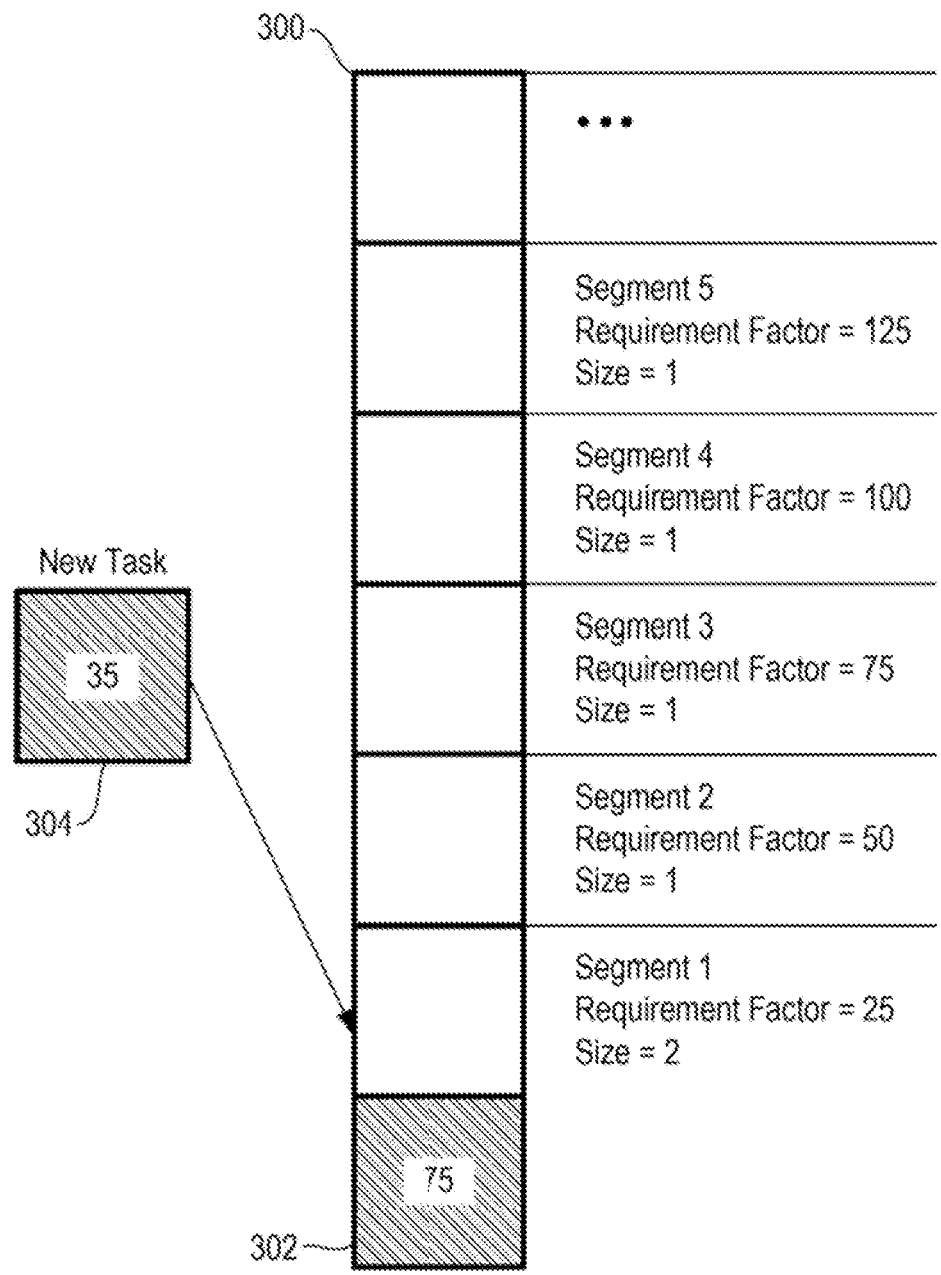

FIG. 3C shows a further step in the operation of queue 300 with segments for task management. At this point in the process, there is one task element 302 stored in the first entry of Segment 1 of queue 300. In a next step of the process, queue management module 102 receives a further new task from task management module 104 and responds by generating a new task element 304 with an importance factor value of 35. The queue management module 102 determines that queue 300 has an empty entry in Segment 1 and that the requirement factor of Segment 1 has a value of 25. In this case, queue management module 102 determines that the importance factor value of 35 of task element 304 is equal to or greater than the value of 25 of requirement factor of Segment 1. In this case, queue management module 102 adds task element 304 to the next empty entry of Segment 1.

Figure 3D:
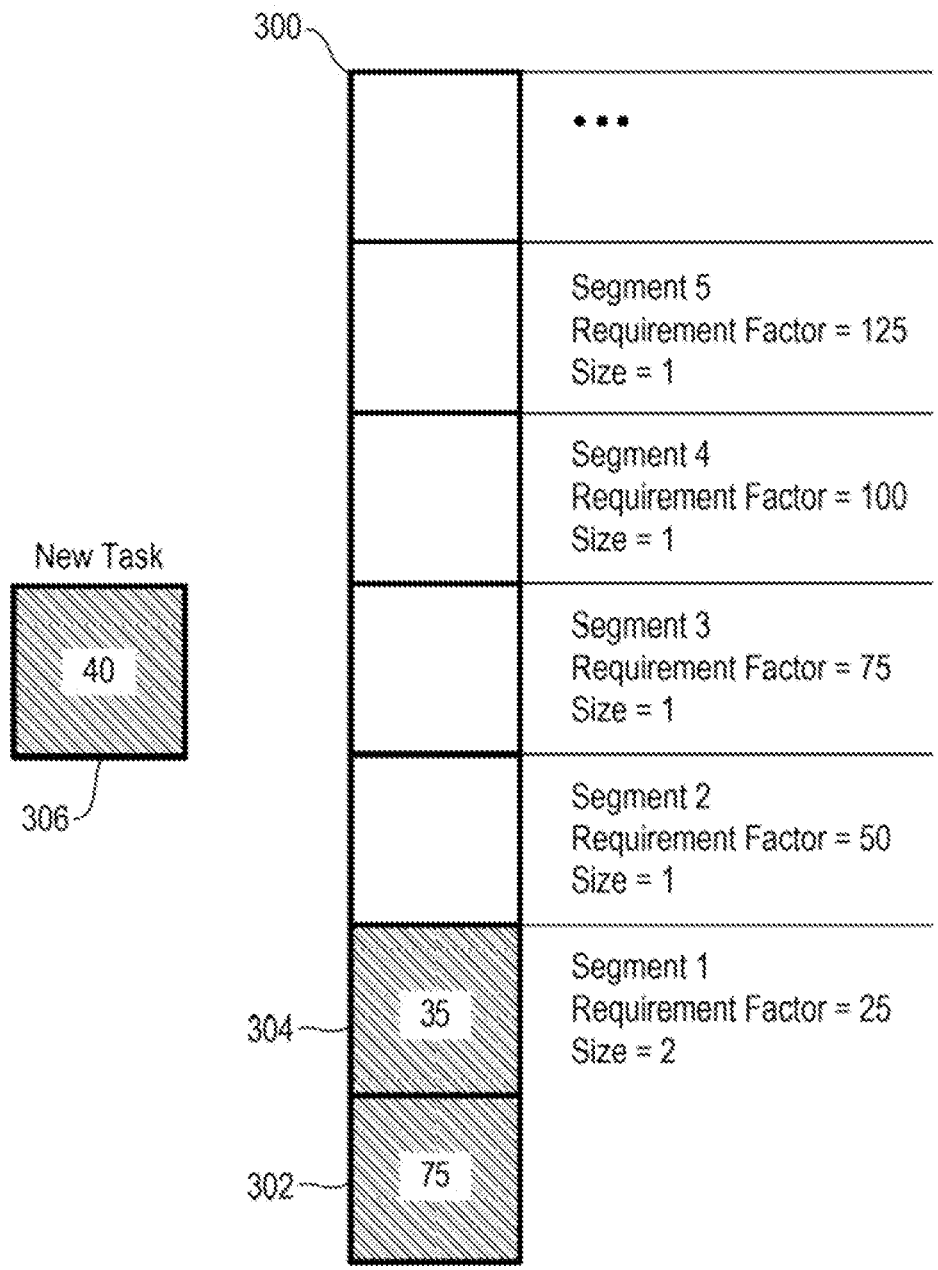

FIG. 3D shows a further step in the operation of queue 300 with segments for task management. At this point in the process, there is one task element 302 stored in the first entry of Segment 1 of queue 300 and a second element 304 stored in the second entry of Segment 1 of the queue. In a next step of the process, queue management module 102 receives a further new task from task management module 104 and responds by generating a new task element 306 with an importance factor value of 40. The queue management module 102 then checks queue 300 and determines that the next available entry for a task element is in Segment 2 which has a requirement factor value of 50. The queue management module 102 performs a comparison process and determines that the value of 40 of the importance facto value of task element 306 is less than the value of 50 of the requirement factor of Segment 2. In this case, since the value of 40 is less than the value of 50, queue management module 102 does not add new task element 306 onto the empty entry of Segment 2 of queue 300, rather the queue management module discards or ignores the new task element.

Figure 3E:
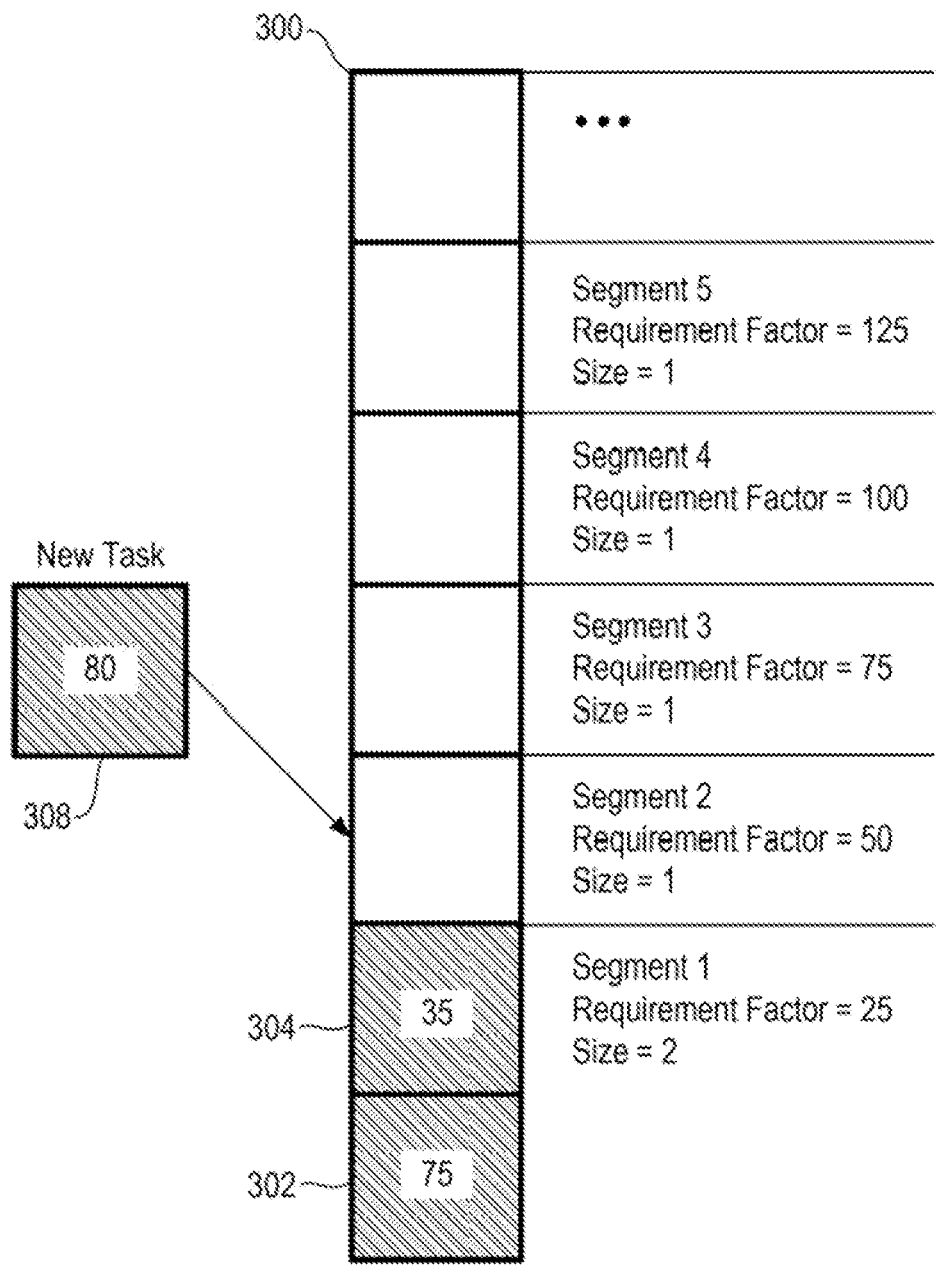

FIG. 3E shows a further step in the operation of queue 300 with segments for task management. At this point in the process, as explained above, there is one task element 302 stored in the first entry of Segment 1 of queue 300 and a second element 304 stored in the second entry of Segment 1 of the queue. In a next step of the process, queue management module 102 receives a further new task from task management module 104 and responds by generating a new task element 308 with an importance factor value of 80. The queue management module 102 then checks queue 300 and determines that the next available entry for a task element is in Segment 2 which has a requirement factor value of 50. The queue management module 102 performs a comparison process and determines that the value of 80 of the importance factor value of new task element 308 is equal to or greater than the value of 50 of the requirement factor of Segment 2. In this case, since the value of 80 is equal to or greater than the value of 50, queue management module 102 proceeds to add new task element 30$ onto the empty entry of Segment 2 of queue 300.

Figure 3F:
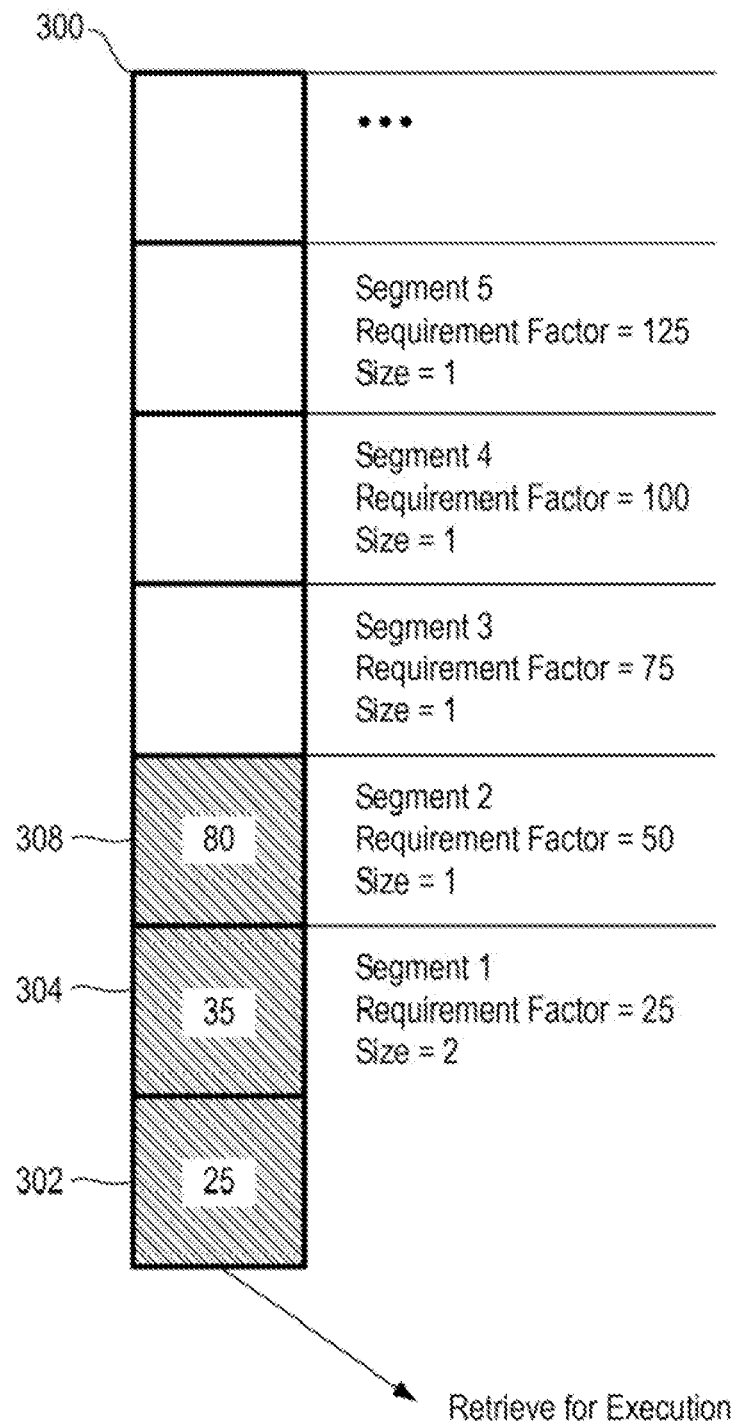

FIG. 3F shows a further step in the operation of queue 300 with segments for task management. At this point in the process, as explained above, there is one task element 302 stored in the first entry of Segment 1 of queue 300, a second task element 304 stored in the second entry of Segment 1 of the queue, and a third task element 308 stored in the entry of Segment 2. As shown, queue management module 102 added third task element 308 onto an entry with the highest value of requirement factor of the queue. The queue management module 102 is configured to not add task element towards the bottom of the queue in segments with lower values, that is, it does not allow the task element to fall or sink towards the bottom of the queue. In other words, queue management module 102 adds a new task element towards the top of queue 300 with segments having higher values. Turning to the process, in a next step of the process, queue management module 102, as part of the task handler function, retrieves and removes task element 302 from the first entry of Segment 1 of queue 300. In one example, queue management module 102 removes task elements from the first entry of Segment 1 of queue 300 or towards the bottom portion of the queue. However, it should be understood that this example is for illustrative purposes and that queue management module 102 can be configured to remove a task element or more than one task element from one or more entries across different segments of queue 300. In one example, queue management module 102 can then forward the removed task elements to task execution module 11 which is responsible for execution of tasks.

Figure 3G:
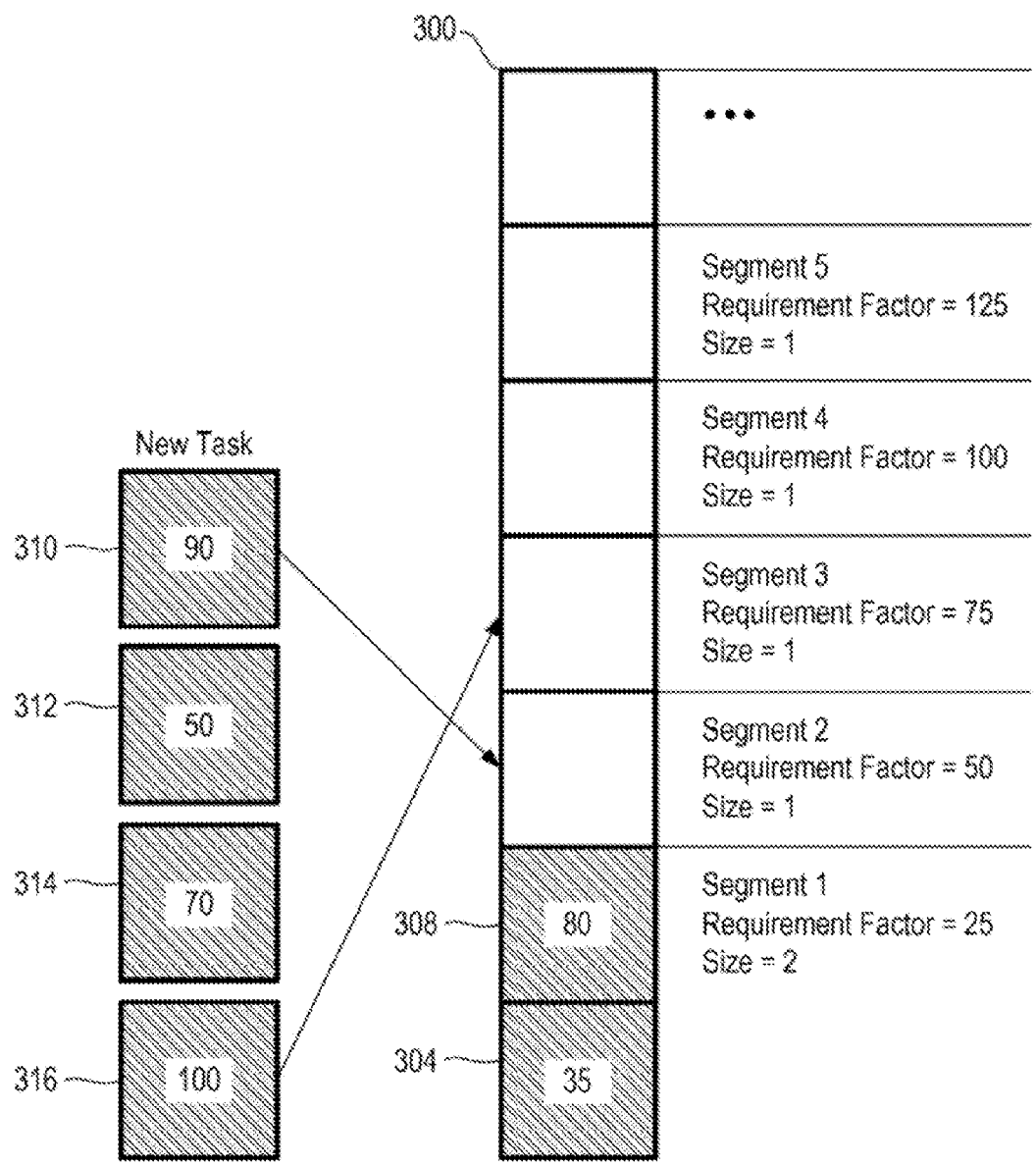

FIG. 3G shows a further step in the operation of queue 300 with segments for task management. At this point in the process, as explained above, there are two task elements remaining on queue 300: task element 304 which is stored in the first entry of Segment 1 of the queue and task element 308 which is stored in the second entry of Segment 1. As explained above, task element 302 is no longer in queue 300 because queue management module 102 removed the task element from the queue.

In a next step of the process, queue management module 102 further receives four new tasks from task management module 104 and responds by generating four new respective task elements: first task element 310 with an importance factor value of 90, second task element 312 with an importance factor value of 50, third task element 314 with an importance factor value of 70, and fourth task element 316 with an importance factor value of 100. The queue management module 102 proceeds to process these new task elements as explained below in further detail.

Further, in the next step of the process, queue management module 102 checks queue 300 and determines that the next available entry for a task element is in Segment 2 which has a requirement factor value of 50. The queue management module 102 performs a comparison process and determines that the value of 90 of the importance factor value of new task element 310 is equal to or greater than the value of 50 of the requirement factor of Segment 2. In this case, since the value of 90 is equal to or greater than the value of 50, queue management module 102 proceeds to add new task element 310 onto the entry of Segment 2 of queue 300.

Further, in the next step of the process, queue management module 102 checks queue 300 and determines that the next available entry for a task element is in Segment 3 which has a requirement factor value of 75. The queue management module 102 performs a comparison process and determines that the value of 50 of the importance factor value of second new task element 312 is less than the value of 75 of the requirement factor of Segment 3. In this case, since the value of 50 is less than less than the value of 75, queue management module 102 does not add second new task element 312 onto the entry of Segment 3 of queue 300, rather the queue management module discards or ignores this new task element.

In a similar manner, in a next step of the process, queue management module 102 checks queue 300 and determines that the next available entry for a task element is in Segment 3 which has a requirement factor value of 75. The queue management module 102 performs a comparison process and determines that the value of 70 of the importance factor value of third new task element 314 is less than the value of 75 of the requirement factor of Segment 3. In this case, since the value of 70 is less than less than the value of 75, queue management module 102 does not add new task element 314 onto the entry of Segment 3 of queue 300, rather the queue management module discards or ignores this new task element.

Finally, queue management module 102 checks queue 300 and determines that the next available entry for a task element is in Segment 3 which has a requirement factor value of 75. The queue management module 102 performs a comparison process and determines that the value of 100 of the importance factor value of fourth new task element 316 is equal to or greater than the value of 75 of the requirement factor of Segment 3. In this case, since the value of 100 is equal to or greater than the value of 75, queue management module 102 proceeds to add new task element 316 onto the entry of Segment of queue 300.

Figure 3H:
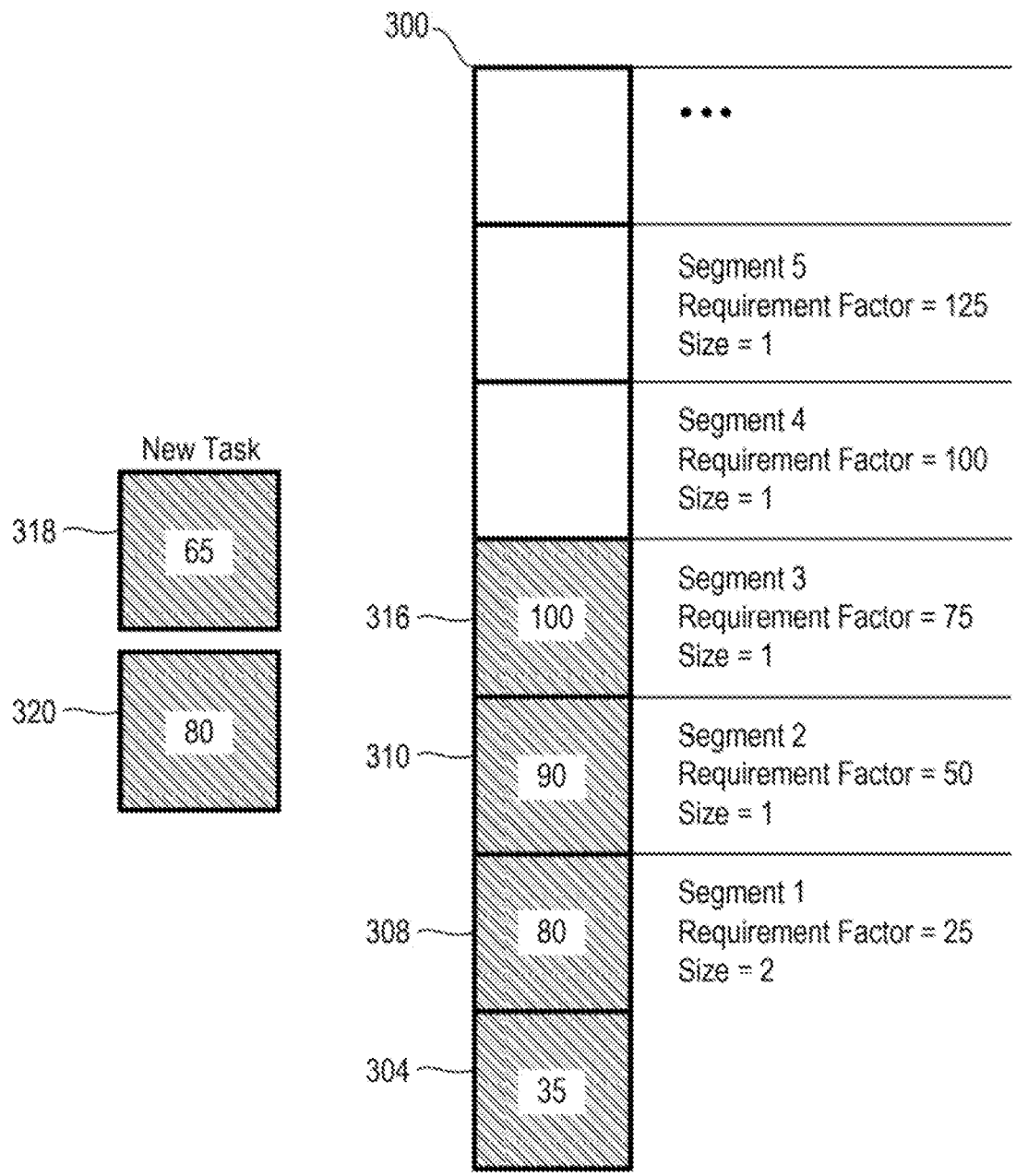

FIG. 3H shows a further step in the operation of queue 300 with segments for task management. At this point in the process, as explained above, there are four task elements remaining on queue 300: task element 304 which is stored in the first entry of Segment 1 of the queue, task element 308 which is stored in the second entry of Segment 1, task element 310 which is stored in the entry of Segment 2, and task element 316 which is stored in the entry of Segment 3.

Further, in the next step of the process, queue management module 102 checks queue 300 and determines that, the next available entry for a task element is in Segment 4 which has a requirement factor value of 100. The queue management module 102 performs a comparison process and determines that the value of 65 of the importance factor value of new task element 318 is less than the value of 100 of the requirement factor of Segment 4. In this case, since the value of 65 is less than the value of 100, queue management module 102 does not add second new task element 318 onto the entry of Segment 4 of queue 300, rather the queue management module discards or ignores the new task element. In a similar manner, in the next step of the process, queue management module 102 performs a comparison process and determines that the value of 80 of the importance factor value of new task element 320 is less than the value of 100 of the requirement factor of Segment 4. In this case, since the value of 80 is less than the value of 100, queue management module 102 does not add second new task element 320 onto the entry of Segment 4 of queue 300, rather the queue management module discards or ignores the new task element. Thus, in this case, both new task elements 318, 320 are ignored by queue management module 102.

Figure 3I:
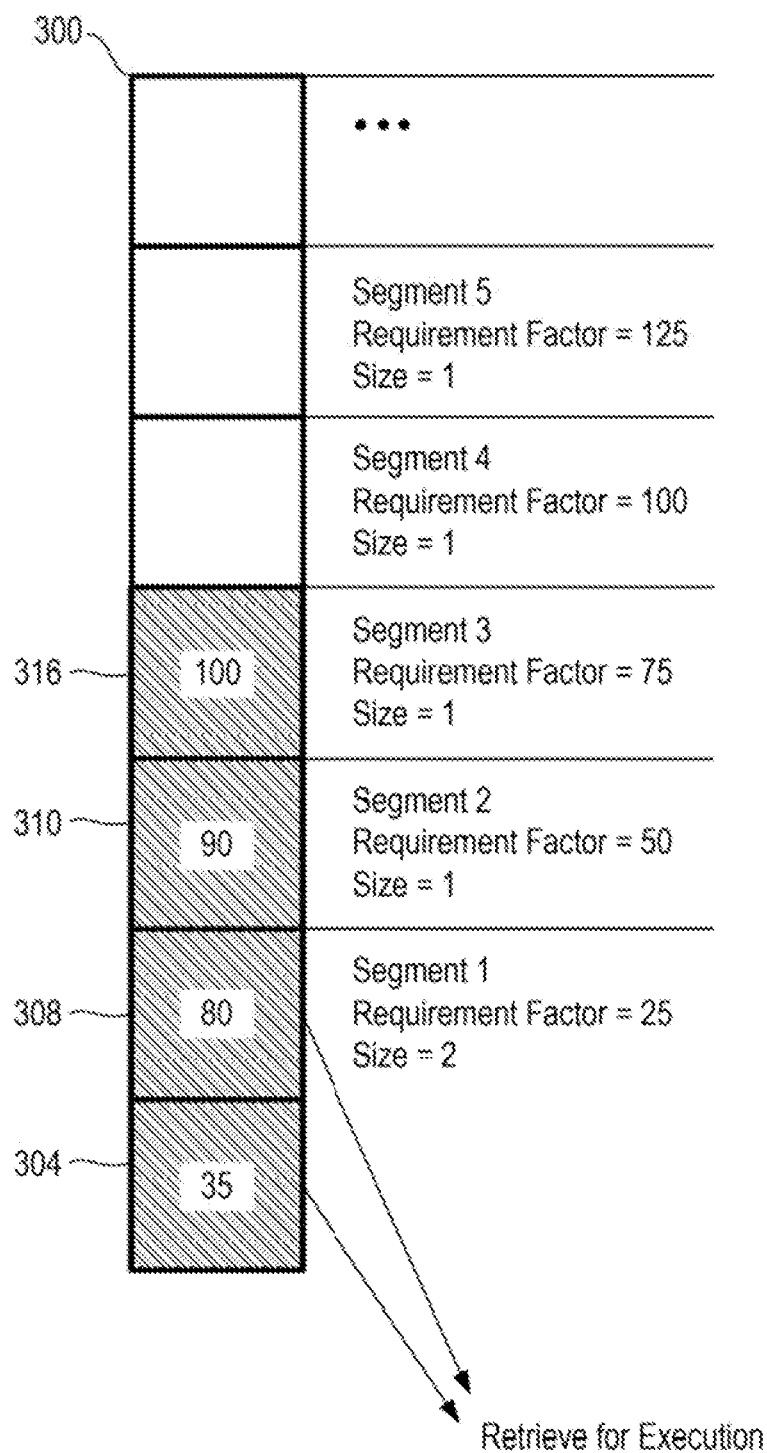

FIG. 3I shows a further step in the operation of queue 300 with segments for task management. At this point in the process, as explained above, there are four task elements remaining on queue 300: task element 304 which is stored in the first entry of Segment 1 of the queue, task element 308 which is stored in the second entry of Segment 1, task element 310 which is stored in the entry of Segment 2, and task element 316 which is stored in the entry of Segment 3. Turning to the next step of the process, queue management module 102, as part of the task handler function, first removes task element 304 from the first entry of Segment 1 of queue 300 and then removes task element 308 from the second entry of Segment 1 of the queue. However, it should be understood that queue management can retrieve a different number of task elements from queue 300. In one example, queue management module 102 can then forward the retrieved task elements to task execution module 118 which is responsible for execution of the tasks.

Figure 3J:
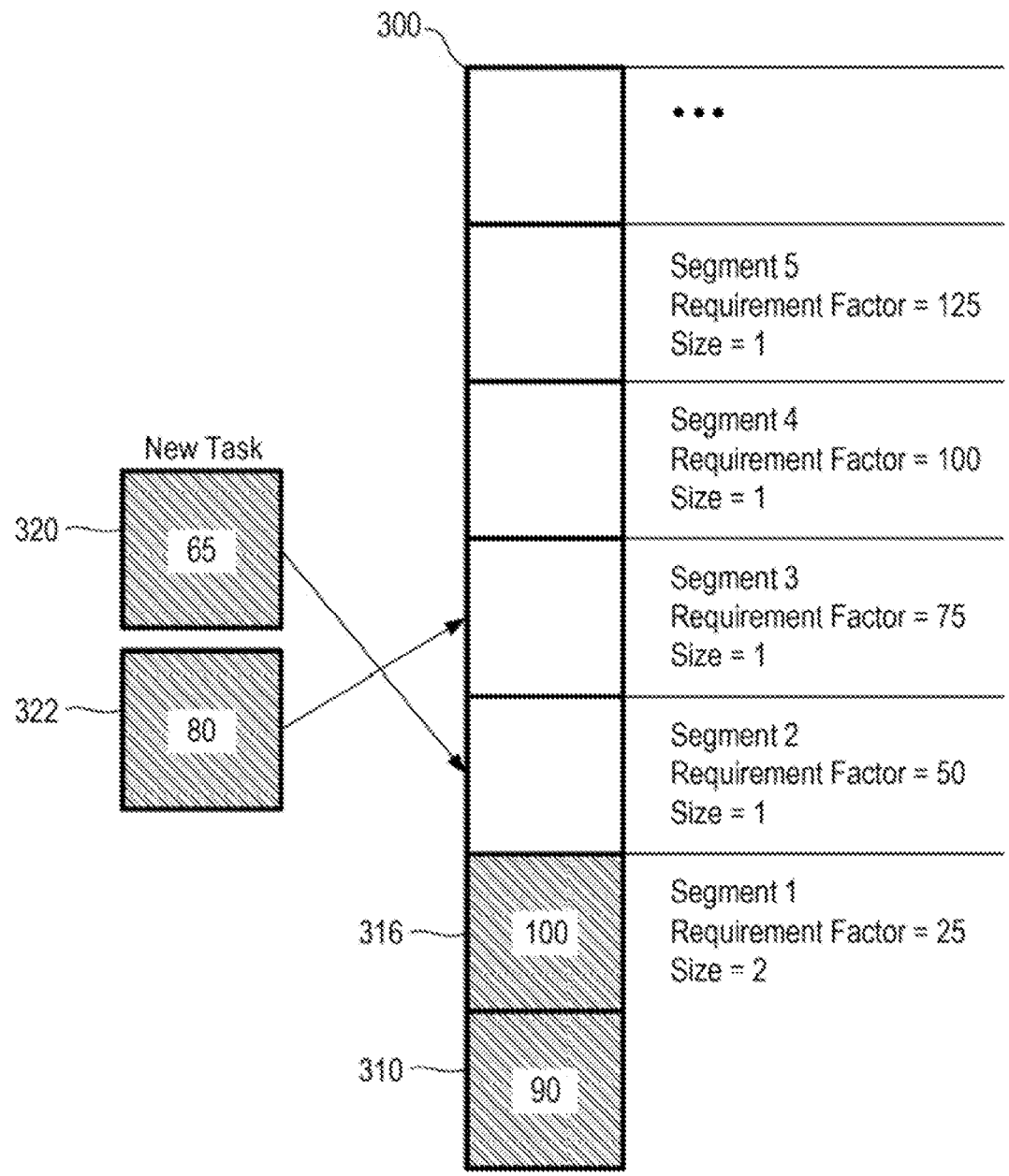

FIG. 3J shows a further step in the operation of queue 300 with segments for task management. At this point in the process, as explained above, there are two task elements remaining on queue 300: task element 310 which is stored in the first entry of Segment 1 of the queue and task element 316 which is stored in the second entry of Segment 1.

In a next step of the process, queue management module 102 further receives two new tasks from task management module 104 and responds by generating two new respective task elements: first task element 320 with an importance factor value of 65 and second task element 332 with an importance factor value of 80. The queue management module 102 proceeds to process these new task elements as explained below in further detail.

Further, in the next step of the process, queue management module 102 checks queue 300 and determines that the next available entry for a task element is in Segment 2 which has a requirement factor value of 50. The queue management module 102 performs a comparison process and determines that the value of 65 of the importance factor value of new task element 320 is equal to or greater than the value of 50 of the requirement factor of Segment 2. In this case, since the value of 65 is equal to or greater than the value of 50, queue management module 102 proceeds to add new task element 320 onto the entry of Segment 2 of queue 300.

In a similar manner, further, in the next step of the process, queue management module 102 checks queue 300 and determines that the next available entry for a task element is in Segment 3 which has a requirement factor value of 75. The queue management module 102 performs a comparison process and determines that the value of 80 of the importance factor value of new task element 322 is equal to or greater than the value of 75 of the requirement factor of Segment 3. In this case, since the value of 80 is equal to or greater than the value of 75, queue management module 102 proceeds to add new task element 322 onto the entry of Segment 3 of queue 300.

Figure 3K:
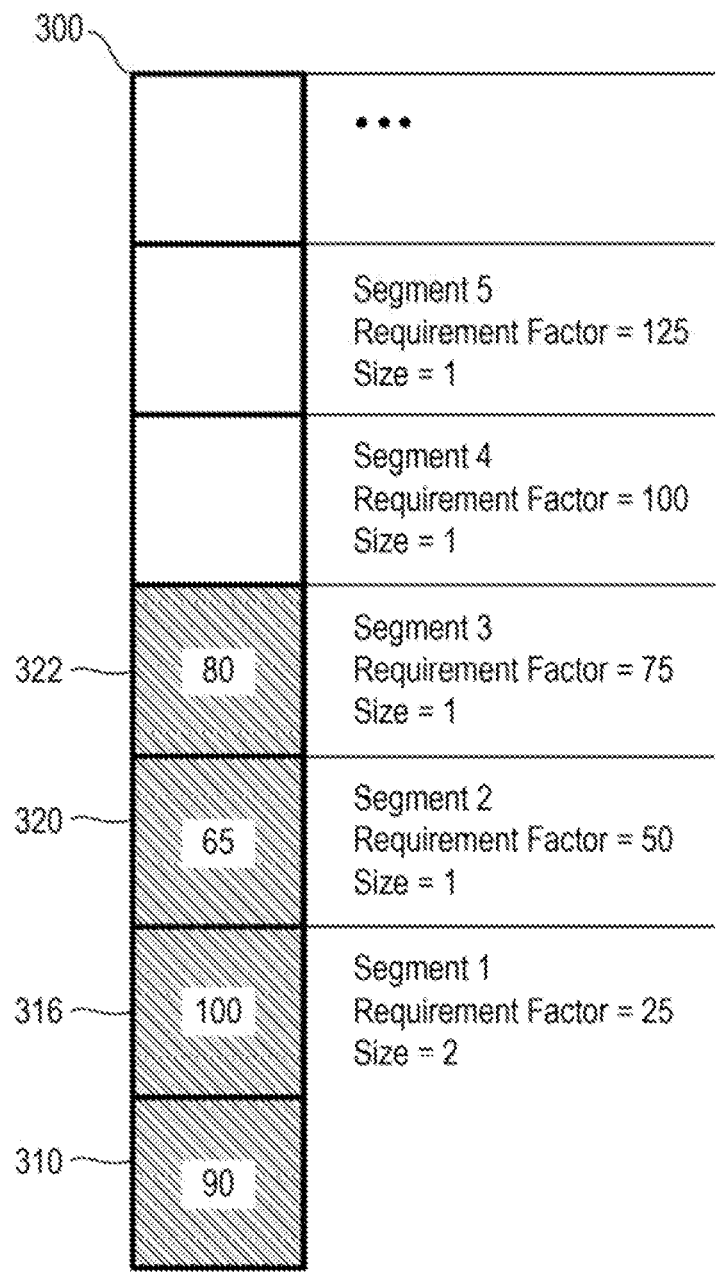

FIG. 3K shows a further step in the operation of queue 300 with segments for task management. At this point in the process, as explained above, there are four task elements remaining on queue 300 task element 310 which is stored in the first entry of Segment 1 of the queue, task element 316 which is stored in the second entry of Segment 1, task element 320 which is stored in the entry of Segment 2 of the queue, and task element 322 which is stored in the entry of Segment 3.

As may be shown above, in one example, the queue management techniques of the present application may provide advantages. For example, the requirement factors assigned to segments of a queue can be configured to have escalating values in the form of linearly increasing requirement factors such that tasks or task elements need to satisfy to be able to be added on the queue. This technique may allow values to be assigned to tasks or task element in the form of importance factors which can help indicate the relative important of the task or work to be done to accomplish the task to be handled at the time. In one example, an application may employ these techniques to configure the queue to have larger size segments which may reduce undesirable abrupt changes that may otherwise occur in an application.

Figure 4:
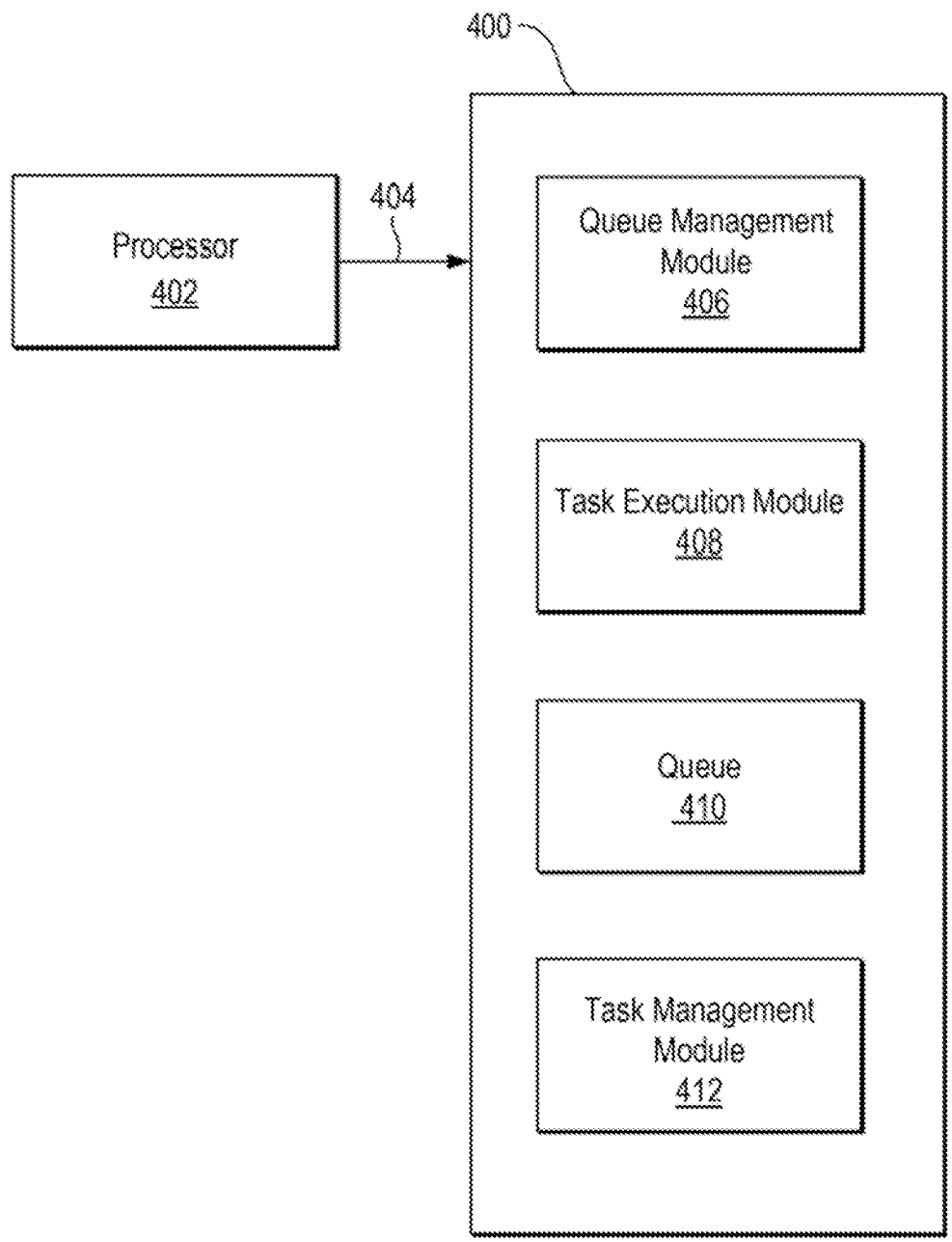
FIG. 4 is an example block diagram showing a non-transitory, computer-readable medium that stores instructions for processing a queue with segments for task management.

FIG. 4 is an example block diagram showing a non-transitory, computer-readable medium that stores instructions for processing a queue with segments for task management. The non-transitory, computer-readable medium is generally referred to by the reference number 400 and may be included in electronic device 100 as described as related to FIG. 1. The non-transitory, computer-readable medium 400 may correspond to any typical storage device that stores computer-implemented instructions, such as programming code or the like. For example, the non-transitory, computer-readable medium 400 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, solid state drives and flash memory devices.

A processor 402 generally retrieves and executes the instructions stored in the non-transitory, computer-readable medium 400 to operate the electronic device in accordance with an example. In an example, the tangible, machine-readable medium 400 can be accessed by the processor 402 over a bus 404. A first region 406 of the non-transitory, computer-readable medium 400 may include functionality to implement queue management module 102 as described herein. A second region 406 of the non-transitory, computer-readable medium 400 may include functionality to implement task execution module 118 as described herein. A third region 410 of the non-transitory, computer-readable medium 400 may include queue 112 functionality as described herein. A fourth region 412 of the non-transitory, computer-readable medium 400 may include functionality to implement task management module 104 as described herein.

Although shown as contiguous blocks, the software components can be stored in any over or configuration. For example, if the non-transitory, computer-readable medium 400 is a hard drive, the software components can be stored in non-contiguous, or even overlapping, sectors.

What is claimed is:

1. An electronic device, comprising:
  a queue implemented in hardware to be configured to have a queue data structure to support a plurality of entries to add task elements; and
  a queue management module implemented in hardware to:
    configure the queue into a plurality of segments, wherein each segment is associated with a depth factor which defines a number of entries of task elements capable of being added in each segment, wherein the queue initially has no task elements and any task element satisfying a requirement factor of one of the plurality of segments is capable of being placed on an entry of the one of the plurality of segments, and wherein each segment is associated with a requirement factor;
    generate a plurality of task elements, each task element having an importance factor, wherein after the task elements have been added to the queue, a minimum importance factor required for a new task element to be added to the queue increases; and
    when a value of an importance factor of a task element is at least equal to a value of the requirement factor of a segment with an available entry to add the task element, then add the task element in the available entry of the segment.

2. The electronic device of claim 1 further comprising a task execution module to initiate tasks associated with the task elements from the queue.

3. The electronic device of claim 1, wherein the queue management module is further to remove a task element from the queue for execution by a task execution module.

4. The electronic device of claim 1, wherein when a value of an importance factor of a task element is not at least equal to a value of a requirement factor of a given segment, then the task element is not added to an entry of the given segment.

5. The electronic device of claim 1, wherein the task elements are based on tasks which are generated by a task management module based on work requested to be performed by the electronic device.

6. The electronic device of claim 1, wherein for a given task element the importance factor represents an importance of a task associated with the given task element relative to other tasks.

7. The electronic device of claim 1, wherein for a given segment the requirement factor represents a minimum value that an importance factor of a given task element is to have in order to be stored in the given segment.

8. The electronic device of claim 1, wherein at least one task element of the plurality of task elements represents a task associated with a movement of data requested to be performed by the electronic device.

9. A method of managing a queue in an electronic device, the method comprising:
  configuring, by a processor, the queue into a plurality of segments, wherein each segment is associated with a depth factor which defines a number of entries of task elements capable of being added in each segment, and wherein each segment is associated with a requirement factor;
  generating, by the processor, a plurality of task elements, each task element having an importance factor;
  increasing, by the processor, a minimum importance factor required for a new task element to be added to the queue after the task elements are added to the queue; and
  when a value of an importance factor of a task element is at least equal to a value of the requirement factor of a segment with an available entry to add the task element, then adding, by the processor, the task element in the available entry.

10. The method of claim 9, further comprising retrieving a task element from the queue for execution by a task execution module.

11. The method of claim 9, wherein when a value of an importance factor of a task element is not at least equal to a value of a requirement factor of a given segment, then the task element is discarded and not added to an entry of the given segment.

12. The method of claim 9, wherein the task elements are based on tasks which are generated by a task management module based on work requested to be performed by the electronic device.

13. The method of claim 9, wherein for a given task element the importance factor represents an importance of a task associated with the given task element relative to other tasks.

14. The method of claim 9, wherein for a given segment the requirement factor represents a minimum value that an importance factor of a given task element is to have in order to be added in the given segment.

15. The method of claim 9, wherein at least one task element represents a task associated with a movement of data requested to be performed by the electronic device.

16. A non-transitory computer-readable medium having computer executable instructions stored thereon to manage a queue, the instructions are executable by a processor to:
configure the queue into a plurality of segments, wherein each segment is associated with a depth factor which defines a number of entries of task elements capable of being added in each segment, and wherein each segment is associated with a requirement factor;
generate a plurality of task elements, each task element having an importance factor;
increase a minimum importance factor required for a new task element to be added to the queue after the task elements are added to the queue;
when a value of an importance factor of a task element is at least equal to a value of the requirement factor of a segment with an available entry to add the task element, then add the task element in the available entry; and
not accept a task element with a lower importance factor in a segment with a higher requirement factor relative to the lower importance factor until the queue catches up or a depth of the queue increases because work satisfying a higher requirement is requested.

17. The non-transitory computer-readable medium of claim 16 further comprising instructions to retrieve a task element from the queue for execution by a task execution module.

18. The non-transitory computer-readable medium of claim 16, wherein when a value of an importance factor of a task element is not at least equal to a value of a requirement factor of a given segment, then the task element is not added to an entry of the given segment.

19. The non-transitory computer-readable medium of claim 16, wherein the task elements are based on tasks which are generated by a task management module based on work requested to be performed by an electronic device.

20. The non-transitory computer-readable medium of claim 16, wherein for a given task element the importance factor represents an importance of a task associated with the given task element relative to other tasks.

* * * * *